US011624459B2

(12) United States Patent
Hesse

(10) Patent No.: US 11,624,459 B2
(45) Date of Patent: Apr. 11, 2023

(54) FITTING FOR CONNECTION TO AT LEAST ONE PIPE

(71) Applicant: Viega Technology GmbH & Co. KG, Attendorn (DE)

(72) Inventor: Christian Hesse, Attendorn (DE)

(73) Assignee: Viega Technology GmbH & Co. KG, Attendorn (DE)

(*) Notice: Subject to any disclaimer, the term of this patent is extended or adjusted under 35 U.S.C. 154(b) by 22 days.

(21) Appl. No.: 16/972,860

(22) PCT Filed: Jun. 6, 2019

(86) PCT No.: PCT/EP2019/064761
§ 371 (c)(1),
(2) Date: Dec. 7, 2020

(87) PCT Pub. No.: WO2019/234140
PCT Pub. Date: Dec. 12, 2019

(65) Prior Publication Data
US 2021/0254762 A1    Aug. 19, 2021

(30) Foreign Application Priority Data
Jun. 8, 2018  (DE) .................... 10 2018 113 713.3

(51) Int. Cl.
*F16L 13/14*    (2006.01)
(52) U.S. Cl.
CPC .......... *F16L 13/141* (2013.01); *F16L 13/143* (2013.01)
(58) Field of Classification Search
CPC ....... F16L 13/14; F16L 13/141; F16L 13/142; F16L 13/143; F16L 33/207; F16L 33/2073; F16L 33/2075; F16L 33/2078; F16L 33/2071; F16L 33/2076
USPC ............ 285/382, 222.1, 222.2, 222.3, 222.4, 285/222.5
See application file for complete search history.

(56) References Cited

U.S. PATENT DOCUMENTS

| 4,330,142 A | * | 5/1982 | Paini ................... F16L 33/2076 |
| 5,853,202 A | * | 12/1998 | Li |
| 6,131,964 A |   | 10/2000 | Sareshwala |

(Continued)

FOREIGN PATENT DOCUMENTS

| CA | 2694589 A1 | 2/2009 |
| CN | 1551962 A | 12/2004 |

(Continued)

*Primary Examiner* — Zachary T Dragicevich
*Assistant Examiner* — William S. Choi
(74) *Attorney, Agent, or Firm* — The Webb Law Firm

(57) ABSTRACT

A metallic connection with a metal pipe, with a base body made of metal, with at least one supporting body made of metal and formed in one piece with the base body for insertion into a pipe end and with at least one pressing sleeve made of metal and connected to the base body for receiving the pipe end, the supporting body and the pressing sleeve being designed for radial pressing, the supporting body having a first sealing section arranged at the distal end with at least one radially encircling sealing tooth has a holding region adjoining the first sealing section in the axial direction, holding teeth which are distributed around the circumference and extend axially, and a second sealing section adjoining the holding region in the axial direction and having at least one radially extending sealing tooth.

5 Claims, 4 Drawing Sheets

(56) References Cited

U.S. PATENT DOCUMENTS

| | | | |
|---|---|---|---|
| 6,692,040 B1 | 2/2004 | McKay et al. | |
| 7,849,884 B2 * | 12/2010 | Dickel | F16L 33/2073 |
| | | | 285/382 |
| 8,752,867 B2 | 6/2014 | Mager et al. | |
| 8,820,797 B2 | 9/2014 | Brill | |
| 10,393,293 B2 | 8/2019 | Crayssac et al. | |
| 2014/0203553 A1 * | 7/2014 | Niubo | F16L 33/2073 |

FOREIGN PATENT DOCUMENTS

| | | |
|---|---|---|
| CN | 201187644 Y | 1/2009 |
| CN | 201487420 U | 5/2010 |
| CN | 201547419 U | 8/2010 |
| CN | 201606605 U | 10/2010 |
| CN | 102971569 A | 3/2013 |
| DE | 29707799 U1 | 8/1997 |
| DE | 19749748 C1 | 4/1999 |
| DE | 19936413 C1 | 3/2001 |
| DE | 202010012981 U1 | 2/2011 |
| DE | 202015105417 U1 | 2/2017 |
| EP | 1195550 A2 | 4/2002 |
| WO | 2015192237 A1 | 12/2015 |
| WO | 2016055720 A1 | 4/2016 |

\* cited by examiner

FITTING FOR CONNECTION TO AT LEAST ONE PIPE

CROSS-REFERENCE TO RELATED APPLICATIONS

This application is the United States national phase of International Application No. PCT/EP2019/064761 filed Jun. 6, 2019, and claims priority to German Patent Application No. 10 2018 113 713.3 filed Jun. 8, 2018, the disclosures of which are hereby incorporated by reference in their entirety.

BACKGROUND OF THE INVENTION

Field of the Invention

The invention relates to a Fitting for making a metallic connection with a metal pipe, with a basic body made of metal, with at least one supporting body made of metal and formed in one piece with the base body for insertion into a pipe end and with at least one pressing sleeve connected to the base body and made of metal for receiving the pipe end.

Description of Related Art

The technical field relevant to the present invention is the installation of piping systems on the construction site, in which a piping system consisting of pipe sections and fittings is generally installed for conducting and guiding a fluid. A fitting is basically understood as a connecting piece of a pipeline and is most frequently used to connect two or more pipe sections. Accordingly, the fitting has two or more press sections. The most common fittings include straight joints, directional changes in the form of pipe bends, reducers, branches such as T-pieces or crossings. However, a fitting is also a pipe connection of a fitting or other component. For example, thermometers or pressure gauges as fittings have only one connection for one pipe section. This means that this fitting has only one press section to connect a pipe section to the fitting.

Press connections are used to connect pipe sections with fittings and other components. A press section of a fitting is formed radially inwards by means of a press tool when the pipe section is inserted, so that a permanent and tight, possibly even undetachable connection is created. The fittings can be designed to be metallically sealed by means of direct contact between the materials of the pipe section and the fitting, for example.

The fittings mentioned above are used in particular in medical gas supply, but also in general in refrigeration and air conditioning technology, industrial and high-pressure applications and basically in gas supply. Up to now, the fittings have only allowed time-consuming types of connection such as brazing or welding, some of which have so far only been permitted in medical applications. These connections have a great potential for error during manufacture and installation. Pipe connecting elements containing plastic-based sealing elements are also prohibited.

From prior art are known metallic sealing connections between fitting and pipe, where axially acting pressing tools are known to generate the necessary high pressing forces. These tools consist of a sliding sleeve with a conical or otherwise tapering inner contour which is pushed onto pressing elements within the fitting in order to form them radially inwards. Axially acting pressing tools, however, are usually complex and do not take up much space.

Such connections have the further disadvantage of only exhibiting insufficient tightness under mechanical stress, especially under torsional stress, since the sealing parts of the fitting must also absorb the mechanical load.

Therefore, the present invention is based on the object of improving the reliability and mechanical strength of the metallic connection to be made between a metal pipe and the fitting.

SUMMARY OF THE INVENTION

According to the invention, the above-mentioned technical problem is solved in that the supporting body includes a first sealing section arranged at the distal end and having at least one radially encircling and radially outwardly projecting sealing tooth, a retaining region adjoining the first sealing section in the axial direction and having retaining teeth distributed around the circumference and extending axially, a second sealing section adjoining the retaining area in the axial direction with at least one radially circumferential and radially outwardly projecting sealing tooth and wherein the supporting body and the pressing sleeve are able to obtain by means of the sealing teeth a metallic seal with a metal pipe without any additional soft seal.

According to the invention, a metallic seal is thus achieved by cutting circumferential sealing teeth into a pipe to be connected. In addition, the sealing function and mechanical load absorption are separated to prevent leakage of the connection between the fitting and the pipe under load. By means of a metallic sealing pressing technique, the fitting can be used in medical gas installations and other applications without the use of soft seals such as polymer sealing materials.

The at least two circumferential and outwardly projecting sealing teeth of the two sealing sections cut into the pipe during pressing and thus seal from the inside between the support body and the inserted pipe. At a position different from the sealing sections, a contour running in the axial direction is incorporated in the form of the retaining teeth, which prevents, or at least reduces, relative movement between the pipe and the support body, especially in the case of torsional movement through positive and frictional locking.

Preferably, the metal of the support body has a greater hardness than the metal of the press sleeve. The fitting therefore consists of at least one pre-assembled outer press sleeve and an associated inner support body, each made of materials with different properties. The material pairing makes it possible to combine a strong plastic deformation of the outer press sleeve with a deformation of the inner support body, which has a specific elastic reserve after pressing. Due to the elastic reserve after deformation, the inner support body tends to deflect, resulting in a permanent surface pressure to the pipe.

The material of the inner support body is stronger and harder than the material of the press sleeve, so that $Re_{inner}/Re_{outer} > 1$ applies, where Re is the yield strength of the metal. The ratio given characterises the strength of the outer to inner sleeve in terms of plasticising behaviour. The ratio should be >1 for all metal combinations.

The material properties can be adjusted in particular by means of a specific heat treatment. The following material combinations are conceivable, for example, whereby in each case the metal of the press sleeve is mentioned first and then the metal of the supporting body or the basic body: copperbrass, brass-brass, copper-copper, copper-steel, aluminium-steel, aluminium-brass, pairs of Cu—Sn alloys, silicon bronze-brass.

In particular, the first sealing section and the second sealing section each have two spaced peripheral sealing teeth, so that the properties of the fitting are further improved. The tightness of the press connection is thus maintained even when strong forces are applied.

It is further preferred that the holding area has at least 10, in particular 16 axially extending holding teeth. This ensures a sufficiently dense, evenly distributed arrangement of retaining teeth, whereby the acting forces, especially torsional forces, are largely, if not completely, absorbed.

Furthermore, it is preferred that the press sleeve has a substantially cylindrical inner contour and a sectionally cylindrical outer contour, wherein a first portion is formed centrally in the axial direction, a second portion is formed adjacent in the distal direction, and a third portion is formed adjacent opposite to the distal direction, wherein the material thickness of the centrally arranged section is greater than the material thickness of the adjacent sections.

Another measure concerns the pipe to be connected. In order to avoid a cross-sectional constriction and the associated pressure losses through the supporting body at the connection point, a targeted expansion of the pipe cross-section is possible. Thus the inner diameter of the support body can be adapted to the inner diameter of the non-expanded pipe.

BRIEF DESCRIPTION OF THE DRAWINGS

In the following, the invention is explained by means of preferred embodiments with reference to the drawing. The drawing show FIG. 1 a first embodiment of a fitting with inserted pipe in longitudinal section, FIG. 2 the basic body with supporting body of the first embodiment in longitudinal section, FIG. 3 the basic body with supporting body of the first embodiment in a perspective view, FIG. 4 the basic body with support body of the first embodiment in cross-section, FIG. 5 the press sleeve of the first embodiment in longitudinal section, FIG. 6 the press sleeve of the first embodiment in a perspective view, FIG. 7 a basic body with supporting body of a second embodiment of a fitting in longitudinal section and FIG. 8 the basic body of the second embodiment in a perspective view.

DESCRIPTION OF THE INVENTION

Figure 1:
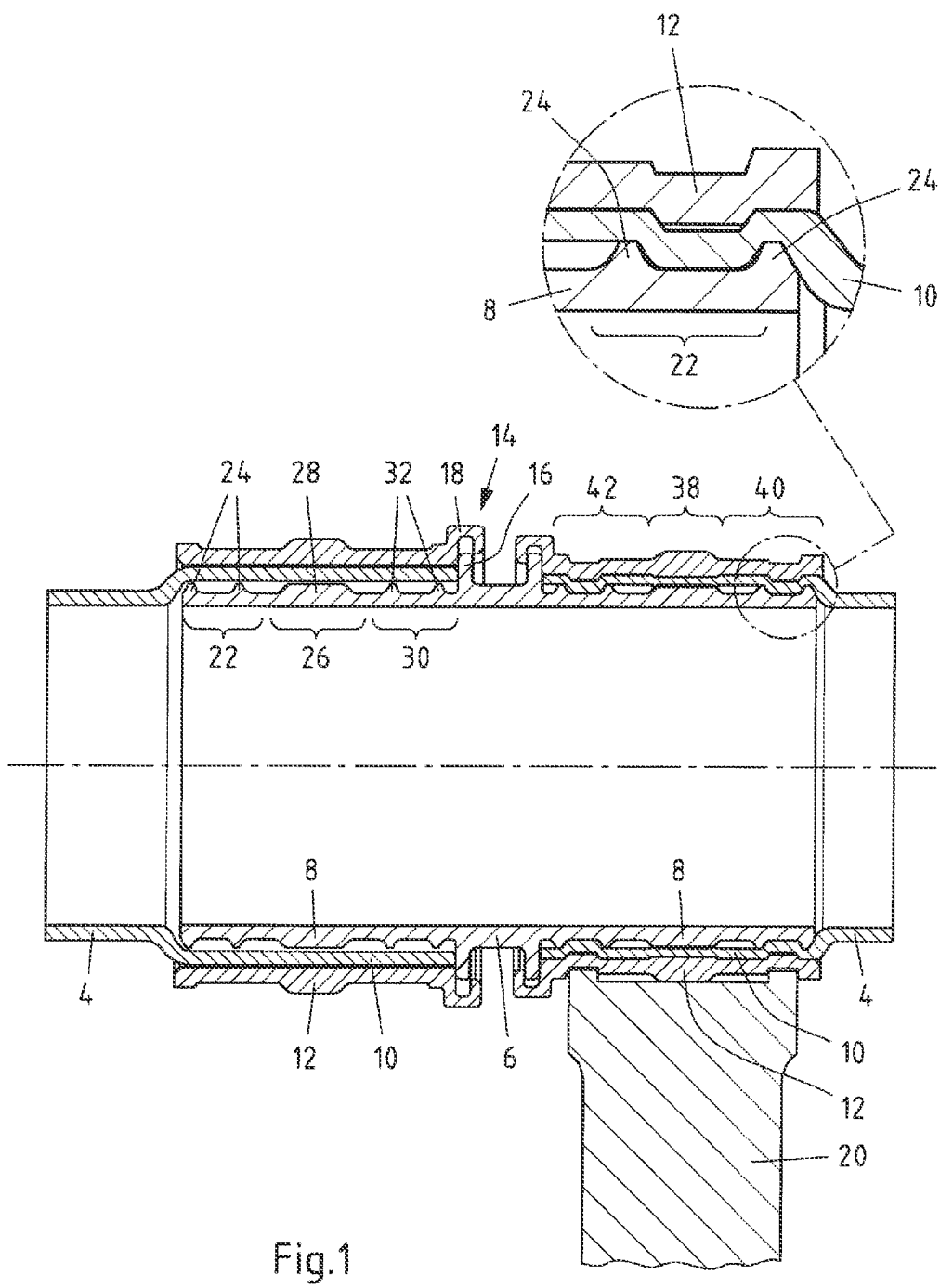
Figure 2:
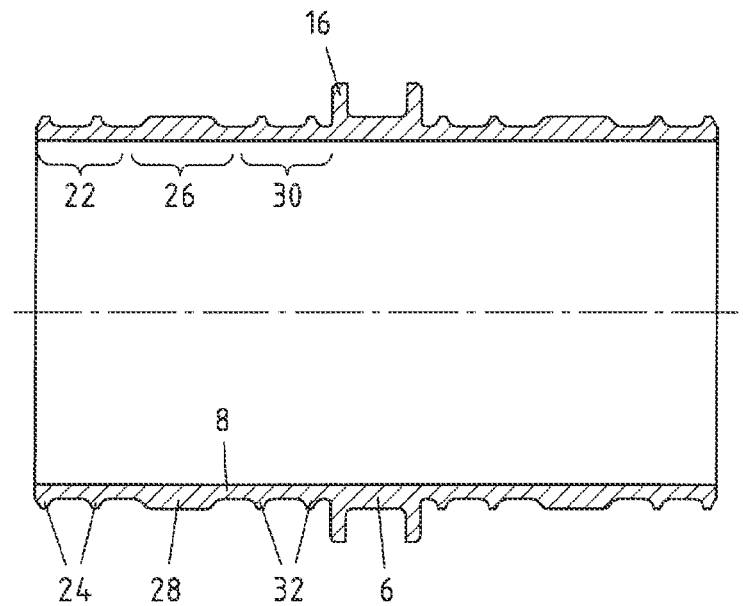
Figure 3:
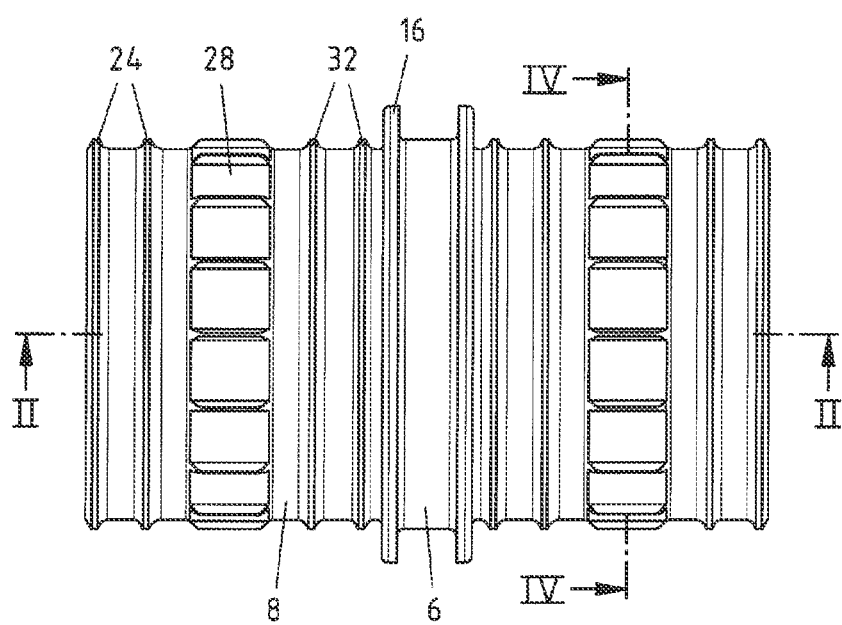
Figure 4:
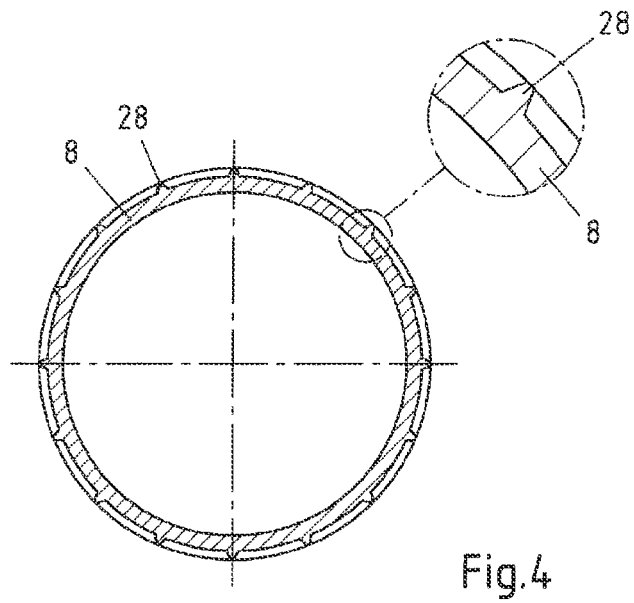

In the following description of the various embodiments in accordance with the invention, components and elements with the same function and the same mode of operation are given the same reference signs, even though the components and elements may differ in dimension or shape in the various embodiments.

FIGS. 1 to 6 show a first embodiment of a fitting 2 for making a metallic connection with a metal pipe 4. The fitting 2 has a basic body 6 made of metal and at least one supporting body 8 for insertion into a pipe end 10 of the metal pipe 4, which is made of metal and is formed in one piece with the basic body 6. Furthermore, at least one press sleeve 12 connected to the basic body 6 and consisting of metal for receiving the pipe end 10 is connected to the basic body 6 by means of a mechanical connection 14 consisting of a web 16 formed on the basic body 6 and an inwardly directed collar 18 formed on the press sleeve 12, which embraces the web 16.

The support body 8 and the pressing sleeve 12 are designed for radial pressing, i.e. they can be pressed by a pressing force directed essentially radially inwards. For this purpose, FIG. 1, right-hand side, shows a pressing tool 20 attached to the pressing sleeve 12 from below, the counterpart of which has been omitted on the upper side of the pressing sleeve for better clarity.

According to the invention, the support body 8 has the following elements. A first sealing section 22 is arranged at the distal end of the support body 8, which in the present embodiment has two radially circumferential sealing teeth 24. Furthermore, a retaining area 26 is arranged which is connected to the first sealing section 22 in the axial direction and has retaining teeth 28 which are distributed around the circumference and extend axially. The number of retaining teeth 28 is 16 in the embodiment shown. Furthermore, the supporting body 12 has a second sealing section 30 which adjoins the retaining section 26 in the axial direction and which also has two radial circumferential sealing teeth 32 in the embodiment shown.

Figure 5:
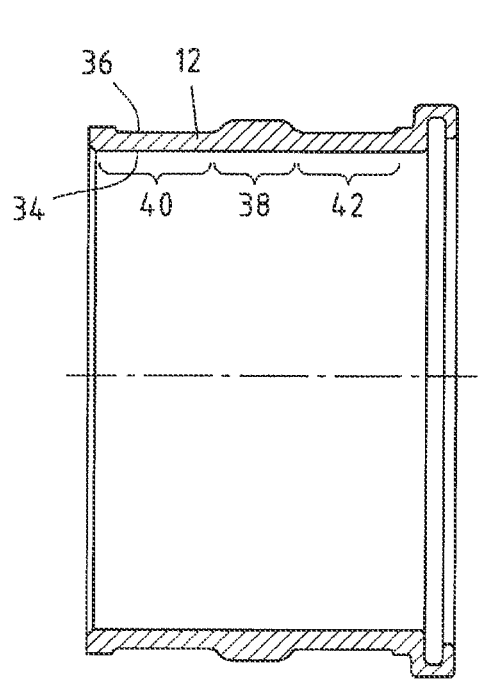
Figure 6:
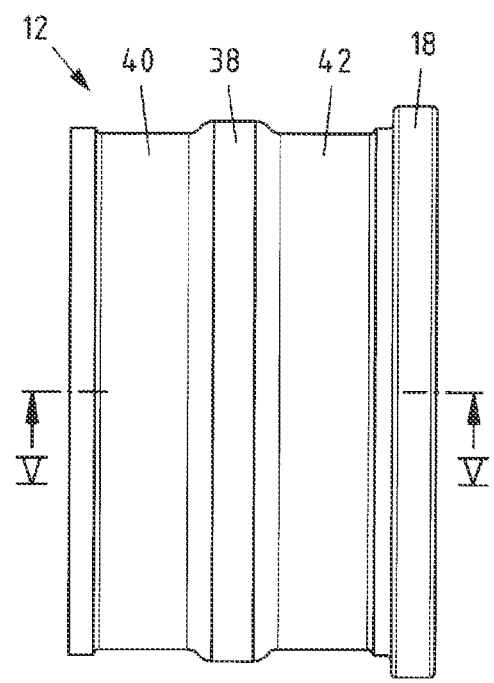

As can be seen in FIG. 1 and FIGS. 5 and 6, the press sleeve 12 has an essentially cylindrical inner contour 34 and a sectionally cylindrical outer contour 36. A first section 38 arranged centrally in the axial direction, a second section 40 adjacent in the distal direction and a third section 42 adjacent in the opposite direction are formed, the material thickness of the centrally arranged section 38 being greater than the material thickness of the adjacent sections 40 and 42.

FIG. 1 shows a fitting 2 with two supporting bodies 8 and two press sleeves 12, whereby the fitting 2 is unpressed on the left side and pressed on the right side.

In the unpressed state the pipe end 10 can be inserted and positioned between the outer contour of the support body 8 and the inside of the pressing sleeve 12. In the embodiment shown, the pipe end 10 is widened compared to the rest of the metal pipe 4, so that the inner diameter of the metal pipe 4 and the inner diameter of the support body 8 and thus of the basic body 6 are essentially the same size, so that no reduction of the flow cross-section is produced by the fitting 2 even in the pressed state.

The right side of FIG. 1 shows the fitting 2 in the pressed state, for illustration purposes a part of a pressing tool in the form of a pressing jaw 20 is shown on the underside of the pressing sleeve 12. The inner contour of the press jaw 20 has a projection 50 at each of the axially distal ends, which presses the pipe end 10 together with the press sleeve 12 onto the two circumferential sealing teeth 24 or 32 in such a way that a tight metallic connection is created between the outside of the support body 8 and the inside of the pipe end 10 at both sealing sections 22 and 30. FIG. 1 shows a detail of the metallic connection at the sealing teeth 24 in an enlargement.

The centrally arranged holding area 38 of the press sleeve 12 has been pressed inwards by the press jaw 20, so that the pipe end 10 in this section has been pressed onto the holding teeth 28 of the holding area 26. This secures the press sleeve 12 and the pipe end 10 against torsional moments and gravity forces and prevents or largely prevents unintentional twisting of the pressed connection.

Figure 7:
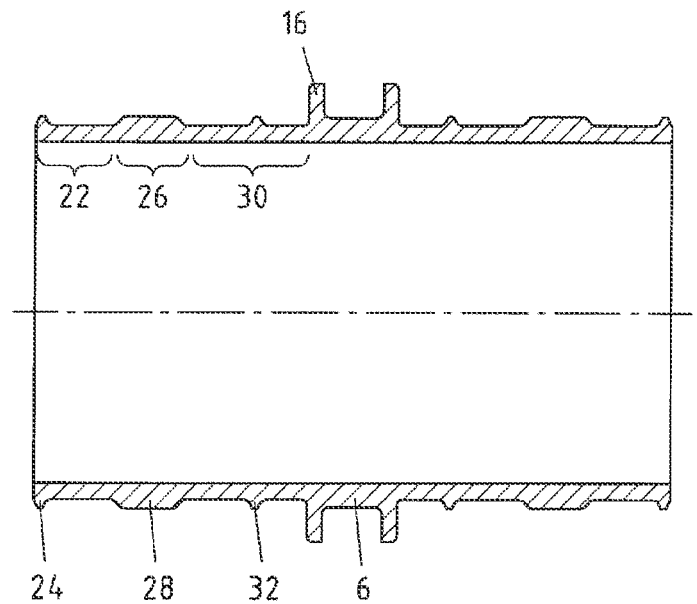
Figure 8:
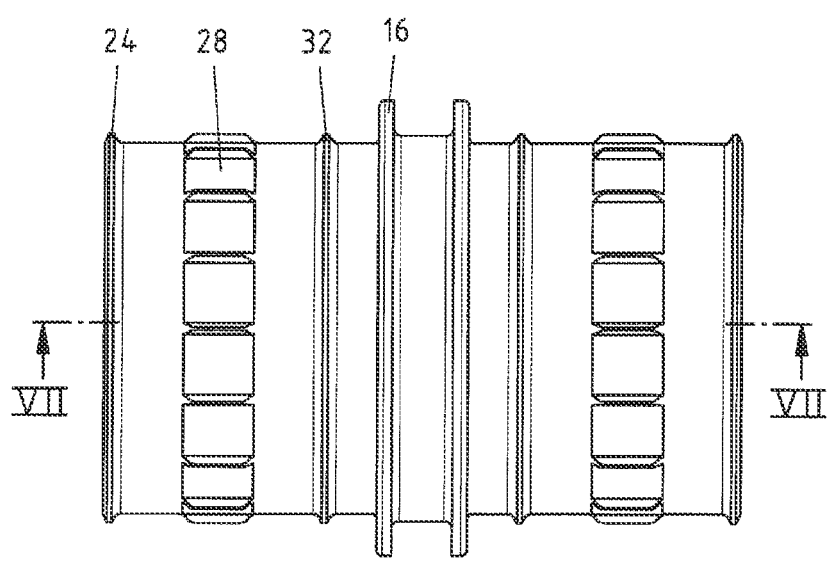

FIGS. 7 and 8 show a fitting 2 of a second embodiment, in which the support body 8 has only one sealing tooth 24 and 32 in both sealing sections 22 and 30. The press sleeve 12 is unchanged from the first embodiment. This fitting also results in a tight and stable metallic connection between the pipe end 10 and the support body 8.

In order to achieve a reliable metallic tight connection, it is intended that the metal of the supporting body 8 has a greater hardness than the metal of the pressing sleeve 12. Thus, the pressing sleeve 12 can be plastically deformed during pressing, while the support body 8 retains its shape to a large extent or completely.

The invention claimed is:

1. A fitting for a metallic connection with a metal pipe, with a basic body made of metal, comprising:
    at least one supporting body made of metal and formed in one piece with the basic body for insertion into a pipe end, and
    with at least one pressing sleeve connected to the basic body and made of metal for receiving the pipe end,
    wherein the support body and the pressing sleeve are designed for radial pressing,
    wherein,
    the supporting body comprises:
        a first sealing section arranged at the distal end and having at least one radially encircling sealing tooth,
        a retaining region adjoining the first sealing section in the axial direction and having retaining teeth distributed around the circumference and extending axially,
        a second sealing section adjoining the retaining region in the axial direction with at least one radially circumferential and radially outwardly projecting sealing tooth, and
        wherein only a metallic seal is formed between the supporting body and the pressing sleeve with a metal pipe.

2. The fitting according to claim 1, wherein the first sealing section and the second sealing section each have two spaced peripheral sealing teeth.

3. The fitting according to claim 1, wherein the retaining region has at least 10-axially extending holding teeth.

4. The fitting according to claim 1,
    wherein the at least one pressing sleeve has a cylindrical inner contour and a sectionally cylindrical outer contour,
    wherein a first portion is formed centrally in the axial direction, a second portion is formed adjacent in the distal direction, and a third portion is formed adjacent opposite to the distal direction,
    wherein the material thickness of the centrally arranged section is greater than the material thickness of the second portion and the third portion.

5. The fitting according to claim 1, wherein that the metal of the supporting body has a greater hardness than the metal of the pressing sleeve.

* * * * *

UNITED STATES PATENT AND TRADEMARK OFFICE
CERTIFICATE OF CORRECTION

PATENT NO. : 11,624,459 B2
APPLICATION NO. : 16/972860
DATED : April 11, 2023
INVENTOR(S) : Christian Hesse It is certified that error appears in the above-identified patent and that said Letters Patent is hereby corrected as shown below:

In the Claims

Column 6, Line 12, Claim 3, delete "10-axially" and insert -- 10 axially --

Signed and Sealed this
Twenty-seventh Day of June, 2023

Katherine Kelly Vidal
Director of the United States Patent and Trademark Office